United States Patent [19]
Eames et al.

[11] Patent Number: 5,260,937
[45] Date of Patent: Nov. 9, 1993

[54] POWER CONSERVING TECHNIQUE FOR A COMMUNICATIONS TERMINAL TIME SLOT INTERCHANGER

[75] Inventors: Thomas R. Eames, Santa Rosa; Lac Trinh, Rohnert Park, both of Calif.

[73] Assignee: DSC Communications Corporation, Plano, Tex.

[21] Appl. No.: 605,269

[22] Filed: Oct. 29, 1990

[51] Int. Cl.$^5$ .............................................. H04J 1/00
[52] U.S. Cl. ................................. 370/68.1; 365/226; 365/229
[58] Field of Search .................. 395/164, 163, 165; 370/66, 67, 68.1, 68, 58.1, 58.2, 58.3, 85.1; 365/226, 227, 228, 229; 455/343; 340/825.44

[56] References Cited

U.S. PATENT DOCUMENTS

| | | | |
|---|---|---|---|
| 4,771,420 | 9/1988 | Deschaine et al. | 370/68 |
| 4,817,086 | 3/1989 | Oye et al. | 370/85.1 |
| 4,881,206 | 11/1989 | Kadono | 365/227 |
| 4,884,264 | 11/1989 | Servel et al. | 370/58.1 |
| 4,937,789 | 6/1990 | Matsubara | 365/226 |
| 4,947,388 | 8/1990 | Kuwahara et al. | 370/60 |
| 4,955,054 | 9/1990 | Boyd, Jr. et al. | 370/68.1 |
| 5,014,266 | 5/1991 | Bales et al. | 370/68.1 |
| 5,040,151 | 8/1991 | Miyawaki et al. | 35/226 |
| 5,046,067 | 9/1991 | Kimbrough | 370/68 |
| 5,058,104 | 10/1991 | Yonehara et al. | 370/68.1 |
| 5,140,557 | 8/1992 | Yoshida | 365/226 |

FOREIGN PATENT DOCUMENTS 55-141890 8/1980 Japan .

Primary Examiner—Douglas W. Olms
Assistant Examiner—Dang Ton
Attorney, Agent, or Firm—Majestic, Parsons, Siebert & Hsue

[57] ABSTRACT

A communications terminal interfaces a large number of potential individual telephone subscriber channels with a wide bandwidth, time multiplexed fiber optic or other type of trunk line. A time slot interchanger within the terminal assigns each of the subscriber channel time slots to one of the time slots in the trunk line signal. Data of the individual time slots of a frame of data of all channels is sequentially stored in a random access memory and then read out in a different sequence. A uniquely addressed location is provided in the memory for data of each individual channel. For cases where all channels are not being utilized, the system omits reading and/or writing data into the corresponding memory data locations not being used, thus saving power.

9 Claims, 2 Drawing Sheets

POWER CONSERVING TECHNIQUE FOR A COMMUNICATIONS TERMINAL TIME SLOT INTERCHANGER

BACKGROUND OF THE INVENTION

This invention relates generally to a telephone communications terminal, and, more specifically, to an electrical power conservation technique that is especially adapted for use therein.

In cases where a large number of individual telephone channels need to be provided between two geographical locations, it is common to multiplex a number of such channels on a single wide bandwidth circuit that extends between the locations. Multiplexing equipment is then provided at each location. This is done primarily to reduce the cost of providing transmission link for a large number of channels between the two locations.

An example is a loop carrier system provided between a large telephone company central office and a concentration of individual telephone subscribers located at least several miles away. A high bandwidth communications circuit is provided from the central office to the customer location, with a multiplexing terminal at each end. The use of a fiber optic transmission media between the terminals has an advantage over the use of a single electrical circuit in its greater bandwidth; that is, optical fiber systems can carry a much greater number of individual telephone channels. The channels are time multiplexed onto a single optical fiber transmission medium by providing repetitive time slots in sequence that are dedicated to each channel. Each terminal, therefore, provides for inserting signals from each channel being transmitted into its unique fiber optic time slot, and directs each received time slot to the correct individual telephone circuit. Each terminal includes a time slot interchanger that allows control of which end user telephone channels are assigned to which time slots in the fiber optic transmission system.

The usual time slot interchanger has a large random access memory ("RAM") with capacity enough to store a frame of data for the signals traveling in each direction through the terminal. A "frame" of data includes a digital sample of the signals traveling in each channel in one direction at a given instant of time. The data sample of each channel is assigned to a unique time slot within the frame. A number of separately addressable data storage locations are provided in the RAM sufficient to store at least two frames worth of signal samples. The order of the data samples read out of the memory is controllably different than that written into the memory, thus providing the function of rearranging (interchanging) the order of the time slots of the frame written into the memory and that read out of the memory.

Two techniques are utilized to bring about such an interchange. One technique is to write the time slot samples of the incoming signal into the RAM in the order received and then read them out randomly in the order desired for the outgoing frame. The second method is to randomly write the incoming time slot signal values into the RAM in the order desired for the outgoing signal and then read out the memory in sequence.

The RAM in such a system must have a number of separately addressable storage locations equal to or greater than the maximum channel capacity of the circuits connected to the interchanger in order to handle communication in one direction. If all of the channels are not being utilized in a particular system configuration, there are unused data storage locations in the RAM. There are two specific cases where this occurs. A first is where the channel capacity of the circuits on one side of the interchanger is much greater than that of the other side of the interchanger. In this case, there will be a large number of unused RAM storage locations at any time. A second case is in parallel implementations of time switches where multiple copies of data must be written for each channel. In this case, only one copy is read out at a time, making it unnecessary to access the RAM locations containing other copies. In each case, the number of storage locations provided in the RAM must be much greater than the number utilized at any one time. This requires providing power to unused RAM and creates an amount of heat that can be quite significant in a large communications terminal.

It is a primary object of the present invention to provide a technique for managing such a RAM in order to reduce its overall power consumption and amount of heat generated.

SUMMARY OF THE INVENTION

This and additional objects are provided by the present invention, wherein, briefly and generally, a tabulation of the unused interchanger RAM locations is maintained and referenced each time a memory access is desired, such access being denied when an unused storage location is being addressed. This avoids the RAM consuming power in performing a read or write operation to a storage location where no data exists or is to be written. A preferred implementation uses a separate power control bit-map RAM to keep track of the unused main memory locations and is simultaneously addressed as the main RAM is addressed. A single bit for each main memory data storage RAM is then read from the power control RAM and used to control whether the main memory will be allowed to operate for that desired access, thus controlling whether it consumes power during that access time.

In a specific example, the main memory is a static RAM type that is characterized by a very low power consumption while in a standby mode, but which consumes a great deal of power during a read or write operation. For this implementation, the power control RAM then disables the main memory RAM during each read or write operation to it where an unused data storage location is addressed.

Additional objects, advantages and features of the present invention will become apparent from the following description of a preferred embodiment thereof, which description should be taken in conjunction with the accompanying drawings.

DESCRIPTION OF A PREFERRED EMBODIMENT

Figure 1:
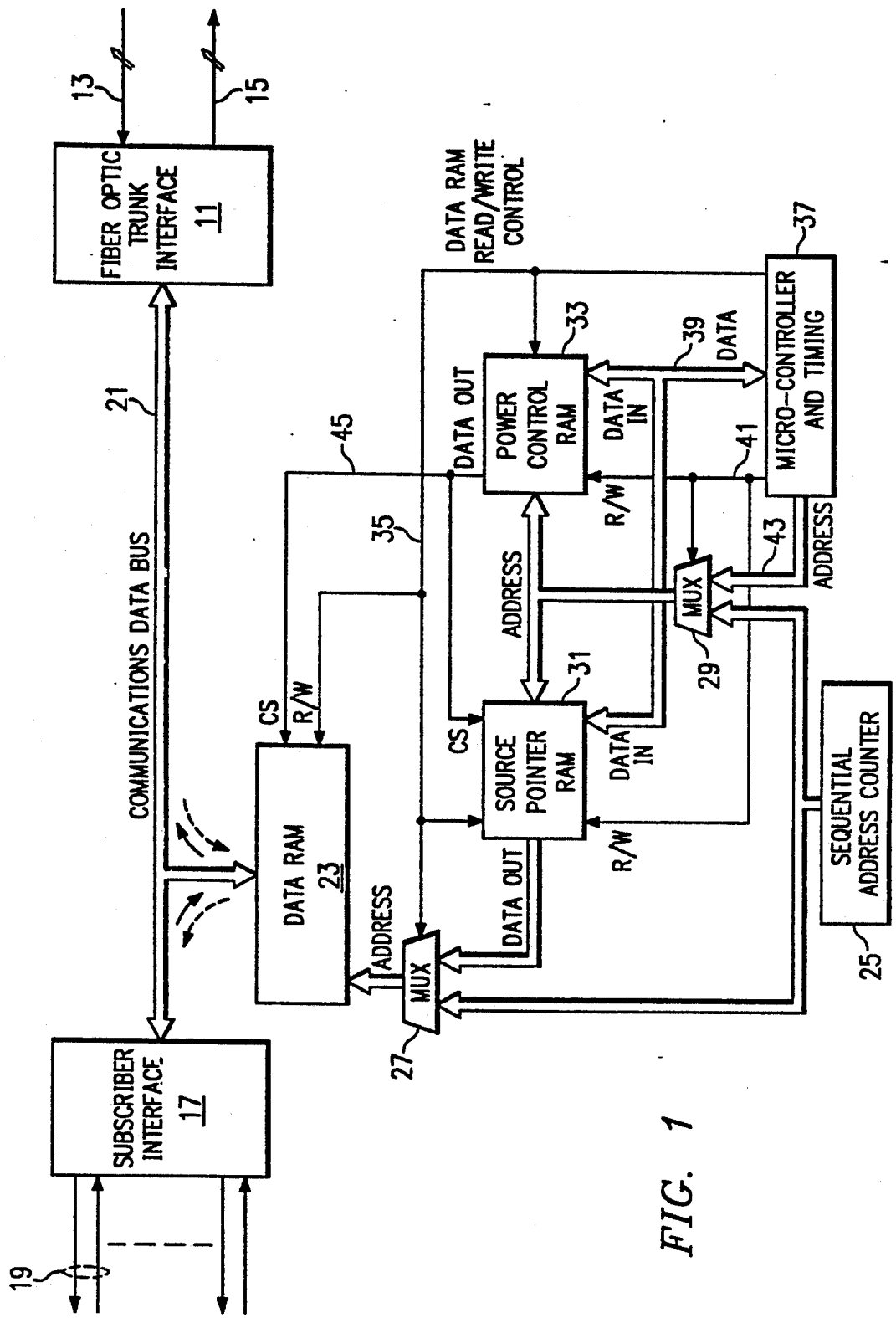
FIG. 1 illustrates in block diagram form a time slot interchanger with an implementation of the power control feature of the present invention.

Referring initially to FIG. 1, a time slot interchanger system is illustrated as a terminal that interconnects a fiber optic trunk with a large number of individual subscriber telephone circuits. Interface circuits 11 terminate an incoming fiber optic link 13 and generate signals for transmission along a separate fiber optic link 15. A second interface 17 communicates with a large number of individual subscriber telephone circuits, such as one such circuit 19. An electrical data bus interconnects the subscriber interface 17 and the fiber optic trunk line interface 11 with a large static RAM 23, a main element of the time slot interchanger system.

As indicated by the solid arrows on FIG. 1, a digital sample of each of the subscriber telephone circuits at a given instant of time is communicated over the bus 21 into the RAM 23. This is referred to as a frame of data. That frame is then read out and sent along the fiber optic medium 15 with the individual telephone channel time slices in a different order than received from the subscriber circuits by the RAM 23. Data similarly flows in the opposite direction, as indicated by the dashed arrows of FIG. 1, with frames similarly handled in that direction.

The time slot interchanger illustrated in FIG. 1 is of a type that writes data of a frame in sequence and then reads out that data randomly in a predetermined sequence to accomplish the desired interchange of time slots between the incoming and outgoing data. An address counter 25 operates to sequentially step through the addresses within an address space of the RAM 23 in which a frame is being temporarily stored. This counter output is applied as one input to each of two switching circuits 27 and 29. The switching circuit 29 normally connects that output to address inputs of a source pointer RAM 31 and a power control RAM 33. The switching circuit 27 selects either the output of the counter 25 or a data output of the source pointer RAM 31 for connection to an address input of the data RAM 23.

The switching circuit 27 is operated in response to a control signal in a line 35 from timing circuits in a controller block 37. When the timing designates that data is to be written to the RAM 23, the switching circuit 27 connects the output of the counter 25 to the address input of the RAM 23. On the other hand, when the timing designates that data is to be read from the RAM 23, the switching circuit 27 connects the data output of the source pointer RAM 31 to the address input of the RAM 23. The control line 35 is also connected to the read/write control terminal of the RAM 23 to specify its operation.

It can thus be seen that, during writing of data in the RAM 23, the address counter 25 causes various data storage locations of the RAM 23 to be addressed in sequence. Data is thus written into the RAM 23 in the order presented. Data signal samples from the various channel time slots are then recorded in known addresses within the RAM 23. When that data is read out, however, it is the data output of the source pointer RAM 31 that supplies the addresses to the RAM 23. The source pointer RAM 31 is loaded with data in each of its locations addressed by the counter 25 to translate that address to a different address of the RAM 23 that reflects the different time slot in which that data is placed upon readout. This operation is typical of any sequential write/random read type of time slot interchanger.

The time slot interchange data is written into the source pointer RAM 31 under the control of the microprocessor 37 over a system data bus 39. A signal in a second read/write control circuit 41 causes the switching circuit 29 to connect the system address bus 43 to the address input of the source pointer RAM 31. The microcontroller 37 then writes data into the RAM 31 in a conventional manner.

Rather than providing an enable or chip select signal in a control circuit 45 directly from the microcontroller and timing 37, however, the RAM 23 is enabled to perform a read or write operation in accordance with data stored in the power control RAM 33. The enable circuit 45 is the data output of the RAM 33. One bit of data is stored in the power control RAM 33 for each of the data locations of the interchanger RAM 23. The RAM 33 is in effect bit mapped to the RAM 23. The data bit in the power control RAM 33 corresponding to a data storage location of the RAM 23 at the same address designates whether that RAM 23 data storage location is being used or not. Thus, if the power control RAM 33 is addressed simultaneously with the RAM 23 being addressed, the RAM 23 is selectively enabled or disabled by a control signal in the circuit 45, depending upon the value of the corresponding bit read from the power control RAM 33 at that instant.

Use of the power control RAM can be limited to either of the read or write operations alone, as desired, but is preferable for maximum power savings that it be utilized during both such operations. In order to do this in the system of FIG. 1, two power control RAM segments are required, one for writing to the RAM 23 and the other for reading from it. The segment is selected by the read/write control signal in the circuit 35, effectively another address bit. Thus, the output of the address counter 25 is applied to either the read or write segment of the power control RAM 33 depending upon which operation is being performed on the data RAM 23.

Data is written into the power control RAM 33 in the same way and at the same time it is written into the source pointer RAM 31, under control of the microcontroller 37. In an operating telephone communications terminal, this data will be written whenever a subscriber is added, designation of subscriber lines is changed, or at any other time it is desired to affect the interchange of time slots between signals of the subscriber and those on the optical fiber link. Once the RAMs 31 and 33 are so loaded, the RAM 23 then automatically cycles to provide the desired time slot interchange of active telephone channels and to disable reading and writing to the RAM 23 in data locations corresponding to unused communication channels. Since static RAMs consumes most of their power during reading and writing operations, a great deal of power is saved by preventing such operations from occurring when there is no data to be written into or read from a give memory address.

This technique is especially advantageous where there is a significant difference in the bandwidth (number of individual telephone channels) of the optical fiber link and that made available to the subscribers through the interface 17. Such a difference exists in a system described in copending patent application Ser. No. 07/597,061, filed Oct. 15, 1990, naming Thomas R. Eames as inventor, and entitled "Subscriber Interface for a Fiber Optic Communications Terminal". In that system, in order to provide a great deal of flexibility and available options in connecting various combinations of different types of subscriber telephone circuits, the number of channels made available at the subscriber interface 17 is many times that of the number of channels carried by the optical fiber communication media 13 and 15. Obviously, the maximum number of subscriber telephone circuits that may be active through the interface 17 cannot exceed the capacity of the fiber optic link, but the added bandwidth capability provided to the interface 17 allows for a great deal of flexibility. This means that the data RAM 23 must have enough data storage locations for each of the large number of channels provided at the subscriber interface 17. But only a fraction of these RAM 23 data locations will be used at any one time, the maximum corresponding to the number of channels that can be carried by the optical fiber link. Thus, avoiding power consumption by the RAM 23 when addressing its unused data locations, being a majority by far, reduces its power needs and heat generation considerably.

The power management technique of this invention is also very useful where a single power control RAM 33 controls multiple time switch interchanger RAMs, namely, where the data RAM 23 is duplicated (not shown). Although the same data may be written into each of these RAMs, it will be read out of only one of them. The power control RAM can be used to prevent a power-consuming read operation from occuring with the remaining RAMs.

Of course, the inclusion of a power control RAM 33 adds a device that consumes power and generates heat. But since only one bit is provided for each data storage location of the RAM 23, the net effect is to reduce overall power consumption and heat generation, especially when only a small percentage of the addressable data locations of the RAM 23 are being utilized. A multiple bit-wide, usually byte wide, memory is preferably utilized for the power control RAM 33. Thus, a number of power control bits is read from that memory in a single read operation. If all the read bits are not used at the same time, they are stored in a register (not shown) and accessed one at a time.

Also, as noted in FIG. 1, the output data of the power control RAM in circuit 45 serves to enable the source pointer RAM 41 during read operations of the RAM 23 at addresses where data is stored and disables the source pointer RAM 31 when the addressed location of the RAM 23 is unused. Thus, there is additional power saving in controlling access to the RAM 31 in the same manner as described for the RAM 23.

Figure 2:
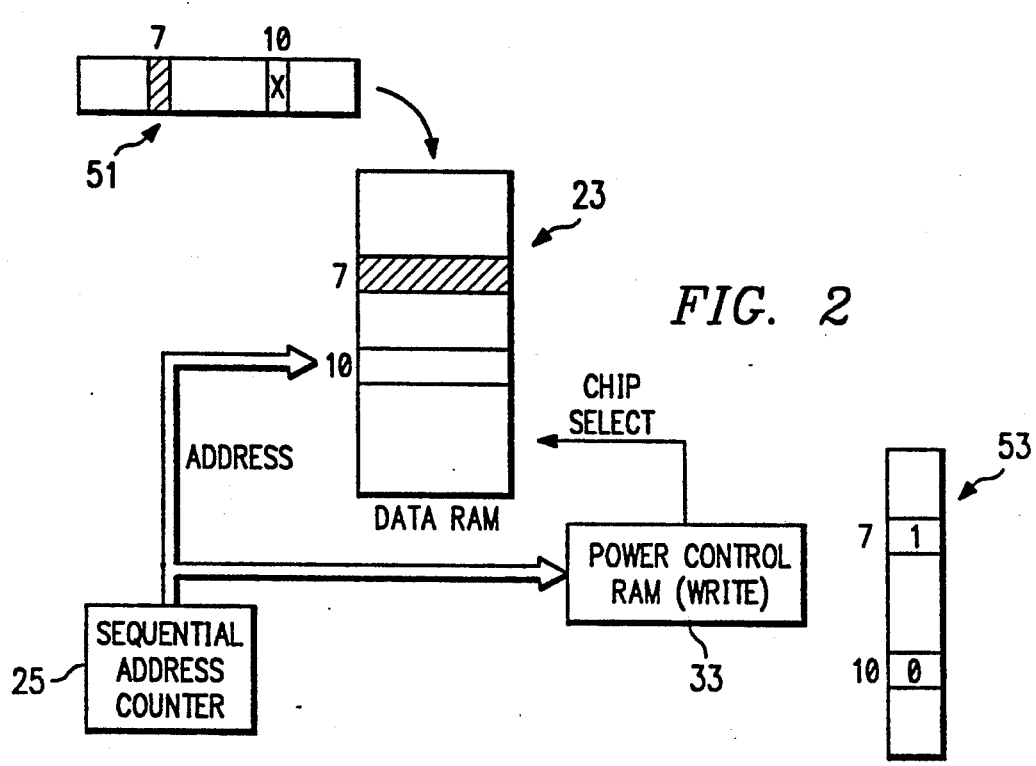
FIG. 2 conceptually illustrates the operation of the system of FIG. 1 during a write operation.
Figure 3:
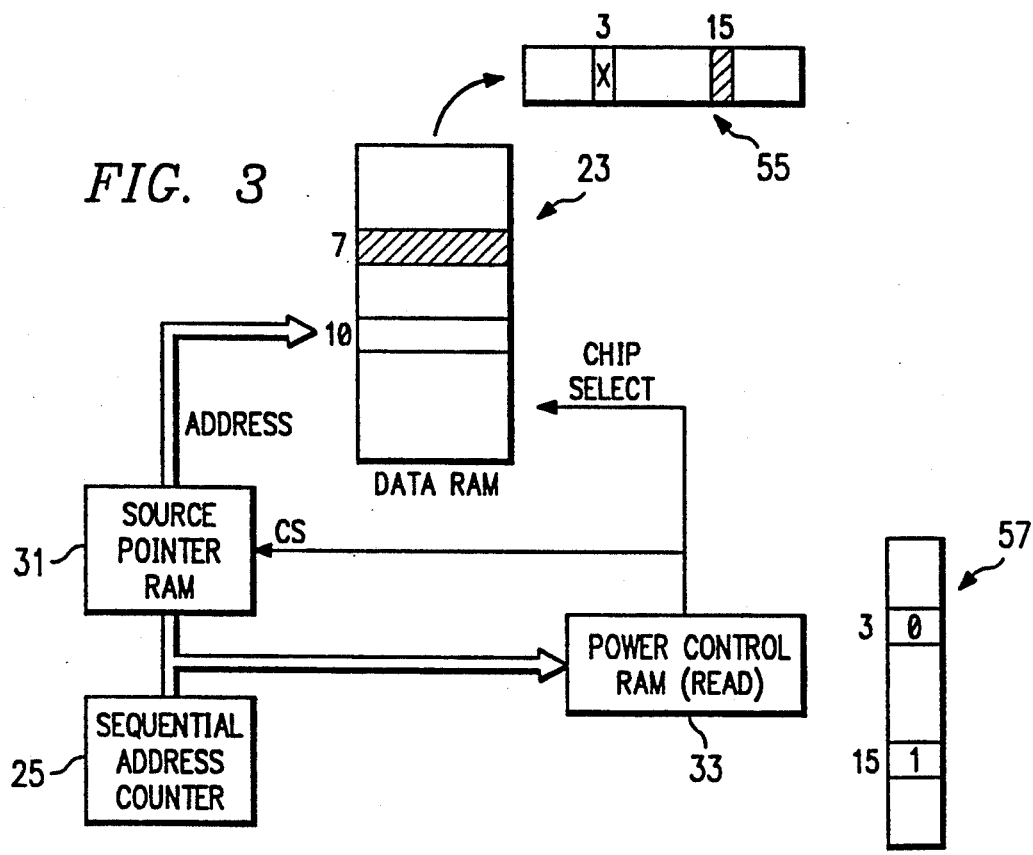
FIG. 3 conceptually illustrates the operation of the system of FIG. 1 during a read operation.

FIGS. 2 and 3 illustrate a principal operation of the system of FIG. 1 during a read and write operation, respectively, of the data RAM 23. In FIG. 2, a data frame 51 includes a number of sequential time slots which each carry a digital sample of different telephone channels. In this example, time slot 7 is shown to include such a sample, while time slot 10 is shown to be unused. When this frame is written into the data memory 23 by the system of FIG. 1, the counter 25 will cause the data in the time slot 7 to be written at location 7 within the memory space illustrated in FIG. 2. Location 10 is unused. The data RAM 23 is enabled to write the data into location 7 by the power control bit in the RAM 33 being set, as illustrated in the memory space 53. But when the counter increments to address 10, in this example, the power control bit stored at that address in the RAM 33 will not enable the data RAM 23, because the power control bit is illustrated to be unset. The power normally consumed by the data RAM 23 during a write operation is saved.

Similarly, as illustrated in FIG. 3, a read operation saves power when the same unused location 10 of the data RAM 23 is addressed. In the read operation, the sequential address of the counter 25 is translated by the source pointer RAM 31 before addressing the data RAM 23. In this example, a frame 55 of data being read from the RAM 23 reads out the data at location 7 into time slot 15. This translation is accomplished by the source pointer RAM 31. When the counter 25 reaches 15, it reads a data value of 7 from the source pointer RAM 31. The data in location 7 is thus placed in time slot 15 of the frame being read out. The data RAM 23 is activated by the read segment of the power control RAM 33 having its power control bit set at address 15, as indicated by memory space 57 of the RAM 33.

Similarly, the unused location 10 of the data RAM 23 is similarly mapped to time slot 3 of the output data frame 55, in this example. That is, when the sequential address counter 25 reaches count 10, this is translated by the source pointer RAM 31 to time slot 3; but when that address is presented to the data RAM 23, the unset bit in location 3 causes the data RAM to be disabled during this access time.

Although the present invention has been described with respect to a preferred embodiment thereof, it will be understood that the invention is entitled to protection within the full scope of the appended claims.

It is claimed:

1. A digital communications terminal adapted to interchange an order of individual communications channel time slots between incoming and outgoing time multiplexed signals, comprising:
   a random access memory having a number of individually addressable data storage locations equal to at least a maximum number of individual time slots in either of said incoming or outgoing signals,
   means sequentially addressing said individual memory storage locations for performing a first data operation between either of said incoming and outgoing signals and said memory,
   means addressing said individual memory storage locations according to a pre-set, non-sequential pattern for performing a second data operation between either of said incoming and outgoing signals and said memory, and
   means responsive to memory storage location addresses of at least one of said first and second data operation performing means for disabling said memory when an addressed data storage location is unused.

2. The communications terminal according to claim 1 wherein said disabling means includes means responsive to memory storage location addresses of both of said first and second data operation performing means for disabling said memory when an addressed data storage location is unused.

3. The communications terminal according to claim 2 wherein said first data operation includes writing data into said memory and wherein said second data operation includes reading data from said memory.

4. The communications terminal according to claim 1 which additionally comprises means responsive to memory storage location addresses of only one of said first data operation performing means for disabling said second data operation means.

5. A digital communications terminal adapted to interchange individual communications channel time slot assignments of a trunk line having a first maximum time multiplexed channel capacity and an interface having a second time multiplexed channel capacity significantly larger than the first, comprising:

a first memory having a number of individually addressable data storage locations equal to at least said second channel capacity, thereby providing a number of data storage locations in excess of the first channel capacity, a second memory containing a table showing the translation time slots of channels between said interface and trunk and connectable to said first memory, an address counter characterized by counting through said first memory data storage locations in a fixed sequence and connectable to said first and second memories, means operably connected to said first memory for writing thereinto and reading therefrom data of the communications channels of said interface and said trunk in accordance with an address output of either of said second memory or said address counter, and means responsive to said address counter for disabling said first memory when an unused addressed data storage location thereof is being addressed, thereby to reduce power consumption of said first memory during when data is not being written to or read from said first memory.

6. The communications terminal according to claim 5 wherein said disabling means includes a third memory having a data output connectable to selectively disable said first memory and an address input connectable to said address counter, said third memory including at least one data bit corresponding to each of the addressable data locations of the first memory which indicate whether the corresponding first memory location is being used or unused.

7. The communications terminal according to claim 5 which additionally comprises means responsive to said address counter for disabling said second memory when an unused addressed data storage location of said first memory is being addressed.

8. The communications terminal according to claim 5 wherein said first memory consists primarily of static random access memory.

9. In a system including a random access memory and means connected to said memory for addressing its data storage locations in a predetermined sequence, said memory being of a type that consumes a low amount of power when in a standby mode and that consumes a high amount of power when enabled to perform a read or write operation to an addressed data storage location, a method of conserving power consumed by the memory, comprising the steps of:

maintaining a record by addresses of individual memory data storage locations within said predetermined sequence of those being used and those being unused, referencing said record when a memory data storage location within the predetermined sequence is being addressed to determine whether that location is being used or unused, and enabling the memory when the addressed data storage location is being used and failing to enable the memory when the addressed location is being unused.

* * * * *